United States Patent
Corrington et al.

[11] Patent Number: 5,875,063
[45] Date of Patent: Feb. 23, 1999

[54] HOUSING FOR REMOVABLE MASS-STORAGE DRIVES

[75] Inventors: Richard A Corrington, Tustin; Steve M. Buu, Irvine, both of Calif.

[73] Assignee: Micronet Technology, Inc., Irvine, Calif.

[21] Appl. No.: 951,815

[22] Filed: Oct. 14, 1997

Related U.S. Application Data

[63] Continuation of Ser. No. 618,290, Mar. 15, 1996, abandoned.

[51] Int. Cl.$^6$ ..................................................... G11B 15/18
[52] U.S. Cl. .................................. 360/71; 360/97.01
[58] Field of Search .......................... 360/97.01, 98.01, 360/71, 69

[56] References Cited

U.S. PATENT DOCUMENTS

| | | | |
|---|---|---|---|
| 4,458,273 | 7/1984 | Johnson | 360/74.1 |
| 4,633,350 | 12/1986 | Hanson | 360/98 |
| 4,833,554 | 5/1989 | Dalziel et al. | 360/98.04 |
| 4,884,261 | 11/1989 | Dalziel | 360/105 |
| 4,912,580 | 3/1990 | Hanson | 360/98.01 |
| 4,956,733 | 9/1990 | Dalziel | 360/105 |
| 5,016,121 | 5/1991 | Peddle et al. | 360/39 |
| 5,041,924 | 8/1991 | Blackborow et al. | 360/69 |
| 5,065,262 | 11/1991 | Blackborow et al. | 360/75 |
| 5,122,914 | 6/1992 | Hanson | 360/98.01 |
| 5,126,890 | 6/1992 | Wade et al. | 360/98.01 X |
| 5,253,129 | 10/1993 | Blackborow et al. | 360/69 |
| 5,297,067 | 3/1994 | Blackborow et al. | 364/708.1 |
| 5,317,464 | 5/1994 | Witt et al. | 360/99.08 |
| 5,327,308 | 7/1994 | Hanson | 360/97.01 |
| 5,515,215 | 5/1996 | Hanson | 360/98.01 |
| 5,583,710 | 12/1996 | Nicklos et al. | 360/71 |
| 5,602,696 | 2/1997 | Hanson | 360/97.01 |

*Primary Examiner*—Andrew L. Sniezek
*Attorney, Agent, or Firm*—Irell & Manella LLP

[57] ABSTRACT

In a housing for removable computer mass-storage drives, commands coming in over a computer bus direct a removable mass-storage drive to spin down. Electronics in the housing detects that a removable mass-storage drive has begun to spin down by sensing the amount of current it is using. Following a delay period which is set by jumpers on the removable mass-storage drive itself, to allow for spin down to complete, the housing actuates a latch which releases the removable mass-storage drive and allows the user to remove it.

4 Claims, 5 Drawing Sheets

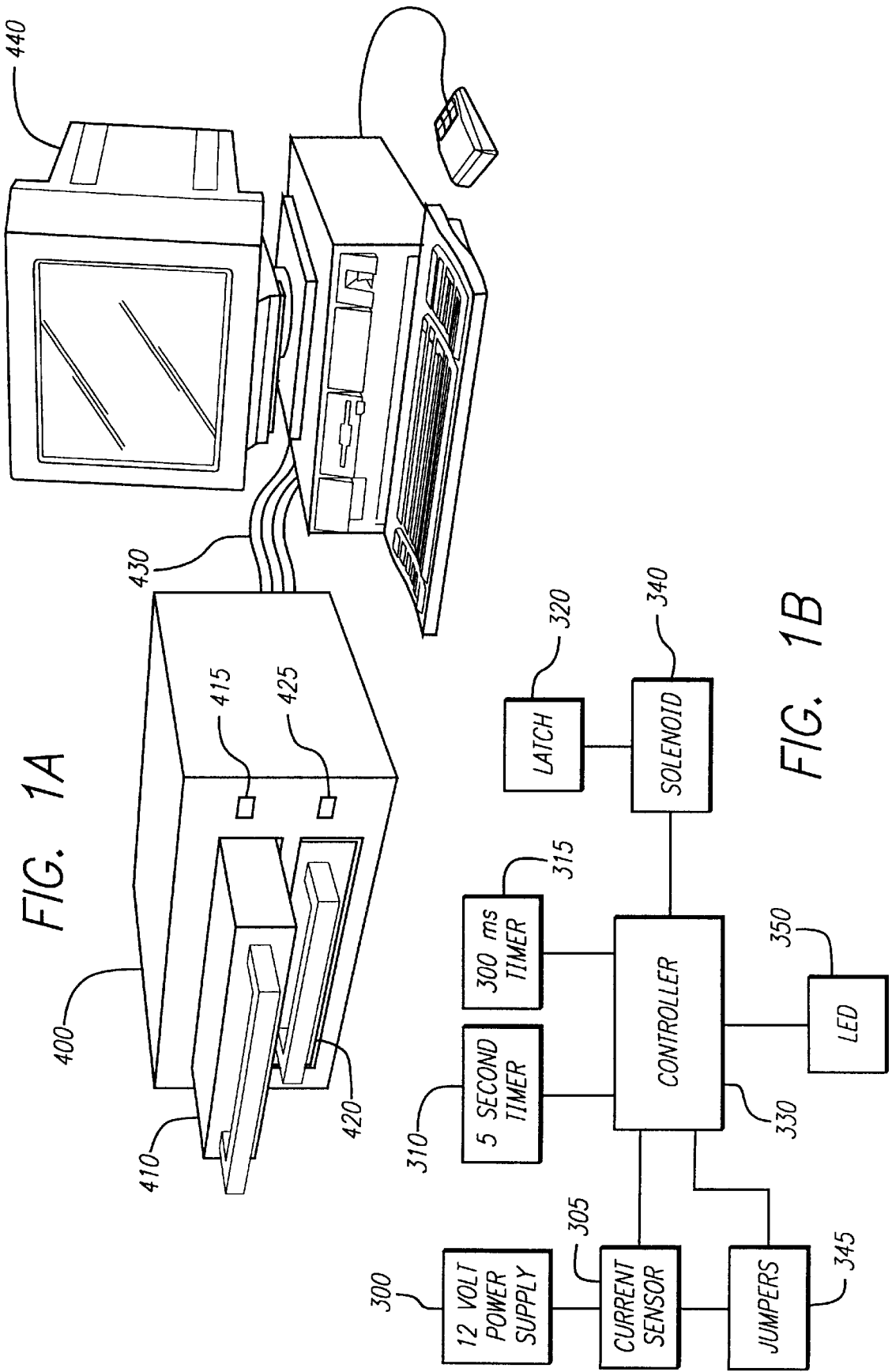

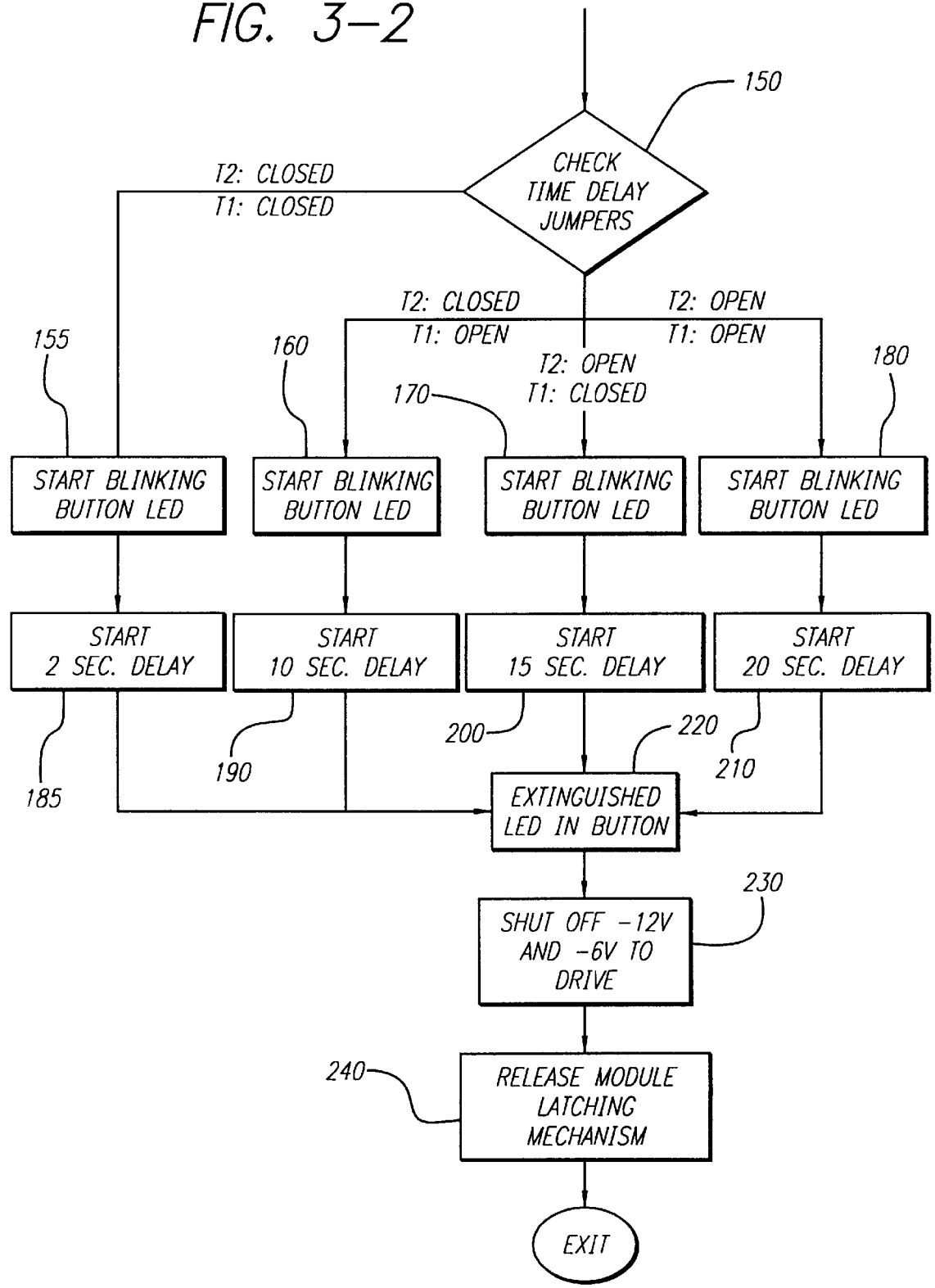

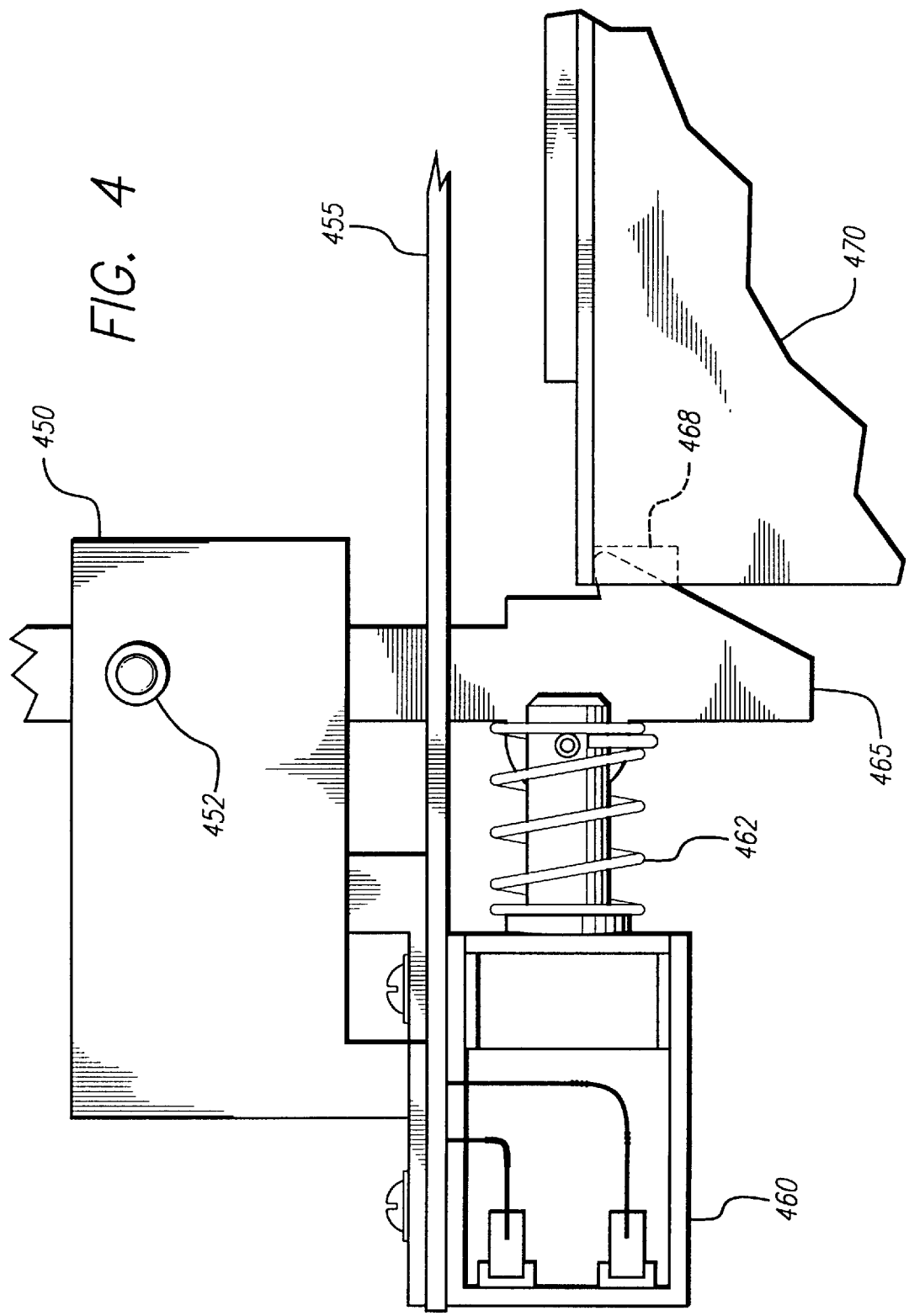

HOUSING FOR REMOVABLE MASS-STORAGE DRIVES

This is a continuation of application Ser. No. 08/618,290 filed Mar. 15, 1996 now abandoned.

BACKGROUND OF THE INVENTION

1. Field of the Invention

This invention pertains to removable rotating mass-storage drives for computers, and more specifically to mechanisms for ensuring that the user does not remove the drives from the computer until it is safe to do so.

2. Related Art

The use of removable computer mass-storage drives, particularly hard disk drives storing hundreds of megabytes, is growing in popularity. An important advantage of removable mass-storage drives is the ability to take large amounts of data from one computer to another and have the data be immediately usable without need of running a copying or backup program to put the data on the second computer's disks. Another advantage is that one can prevent tampering with the data in a computer by locking a removable mass-storage drive containing that data in a safe or drawer. Locking removable mass-storage drives is generally much easier and more convenient than locking away the computer itself.

Removable mass-storage drives are to be distinguished from drives (whether removable or not) having removable storage media. In a removable mass-storage drive, only the drive as a whole is removable. The magnetic or other media inside the drive is not itself removable without the remainder of the drive.

Although it has proven possible to design removable mass-storage drives which can withstand the ordinary shocks of being transported from one computer to another, rotating removable mass-storage drives can only be moved safely once they have stopped spinning. Moving the drives while they are still spinning risks damage to them. It typically takes tens of seconds for rotating mass-storage drives to "spin down." It is thus desirable to prevent users from removing rotating removable mass-storage drives while they are still spinning.

In older technology it was comparatively easy to provide this safety function. A locking mechanism actuated by a solenoid would keep the removable mass-storage drive from being pulled out whenever it was spinning. The user would press a button on the drive or on the drive housing to direct that the drive spin down. After this button was pressed, the drive would spin down and, following a certain preset time interval, the locking mechanism would release and let the user pull the drive out of the housing.

The development of ever-more sophisticated user interfaces, however, has made it desirable to move to a system in which the spinning down and locking function operates under software control. In a Macintosh computer in particular, users are accustomed to having their floppy disks and other removable storage media eject under software control. Instead of pressing an eject button on the floppy disk drive (as PC users do), Macintosh users use a mouse to operate on an icon on their screen which represents the floppy disk drive, overlaying that icon on another icon in the form of a trash can. They thereby cause software to command the drive to eject the floppy. To make this happen, the ejection function on the drive has to be under the control of operating system software on the Macintosh. An ejection function driven by the operating system software has a number of advantages. For example, with such a function software always knows when floppies are removed, and thus one does not get into situations where the software only notices the absence of a floppy long after it is gone and refuses to proceed until the user puts that floppy back, as certain PC software does.

Macintosh users who employ removable mass-storage drives, such as removable hard disk drives, want to be able to use a user interface for spinning down and removing those drives which is analogous to the user interface they employ for ejecting floppy disks and other removable media. Because of this demand for more sophisticated user interfaces to deal with removable mass-storage drives, the drives now have to spin down, not in response to the user pressing a button on the drive housing or on the drive itself, but in response to a command which comes over a bus from the computer. That bus may be, for example, the Small Computer Systems Interconnect (SCSI) bus. In response to that command, all the steps needed to bring the removable mass-storage drive to a state where the user can pull it out have to take place automatically. In particular, it is necessary that the locking mechanism, which prevents the user from removing the drive until it has spun down, operate in response to that command.

One solution to this problem is to have the electronics that operates the locking mechanism monitor the computer bus and respond to spin down commands which are asserted on that bus by the software. This solution, however, suffers from serious drawbacks. To begin with, while the removable mass-storage drives themselves contain complex electronics which can perform the actual spin down, the locking mechanism is normally part of the housing for the removable mass-storage drives and not part of the removable mass-storage drives themselves. That housing is often a box containing little more than mechanical support for the removable modules, a power supply, and various connectors. It does not normally contain the kind of comparatively expensive digital electronics which is needed to respond to bus commands over a bus such as the SCSI bus, and it would not be cost-effective to add such electronics just for the purpose of carrying out the locking and unlocking. A second important problem with this solution is that each drive which is connected onto a bus such as a SCSI bus creates loading on that bus, which consumes power and limits the possibility of connecting other devices to the bus. It is thus undesirable to connect the housing as an additional device on the bus and impose this burden on the bus simply in order to perform the locking and unlocking function.

SUMMARY OF THE INVENTION

It is thus an objective of the invention to design a housing for removable mass-storage drive in which the drive locking function operates reliably in response to a spin down command sent by software over a bus without having the housing become an additional device on that bus. It is a further objective of the invention to design a housing for removable mass-storage drives in which the drive locking function is implemented with low-cost electronics of the kind normally contained in such housings, so that the locking function does not add significant cost to the housing. It is a further and more general objective of the invention to implement the drive locking function at a minimum cost, given that removable mass-storage drives are a mass-market product in which there is intense worldwide competition. It is a further objective of the invention to adapt to different types of removable drives so as to be able to work with a wide range of removable mass-storage technologies.

The invention achieves these objectives by using the amount of current drawn from the 12 volt power supply by a particular drive to tell when the drive has started to spin down, and thus to tell when to start the countdown leading to unlocking. Because it is the housing which supplies 12 volt power to each removable drive, low-cost electronics inside the housing can measure that current and compare it to a threshold value. Furthermore, it is found that the delay between the detection of the fall in current used by the removable drive and the deactivation of the locking mechanism can conveniently be determined on the basis of jumper settings on the drive. Determining the delay in this fashion allows each removable drive to tell the housing, in effect, how long a delay it needs until the user can safely pull it out.

While it would be possible to use the same time delay for all removable mass-storage drives, simply by selecting a time delay which is long enough to ensure the safe operation of every module designed to plug into the housing, from a user's perspective it is preferable if the removable mass-storage drives are not locked for an unnecessary period of time. It is thus desirable if the removable mass-storage drives can communicate to the housing the time interval which they need to complete spin down. The most convenient way to do this is by means of jumpers located on the removable mass-storage drives. It is found that in practice two jumpers, allowing a choice of three time delays (10, 15, and 20 seconds) are adequate to deal with the removable drives which arise in practice. The two jumpers are set at the factory when the removable drives are manufactured so as to convey the optimal time delay for the modules.

BRIEF DESCRIPTION OF THE DRAWINGS

FIG. 1A depicts the environment for which the invention is designed.

FIG. 1B is a block diagram of the preferred embodiment of the invention.

FIG. 4 depicts the mechanical design of the latch used in the preferred embodiment.

DETAILED DESCRIPTION OF THE INVENTION

Figure 2:
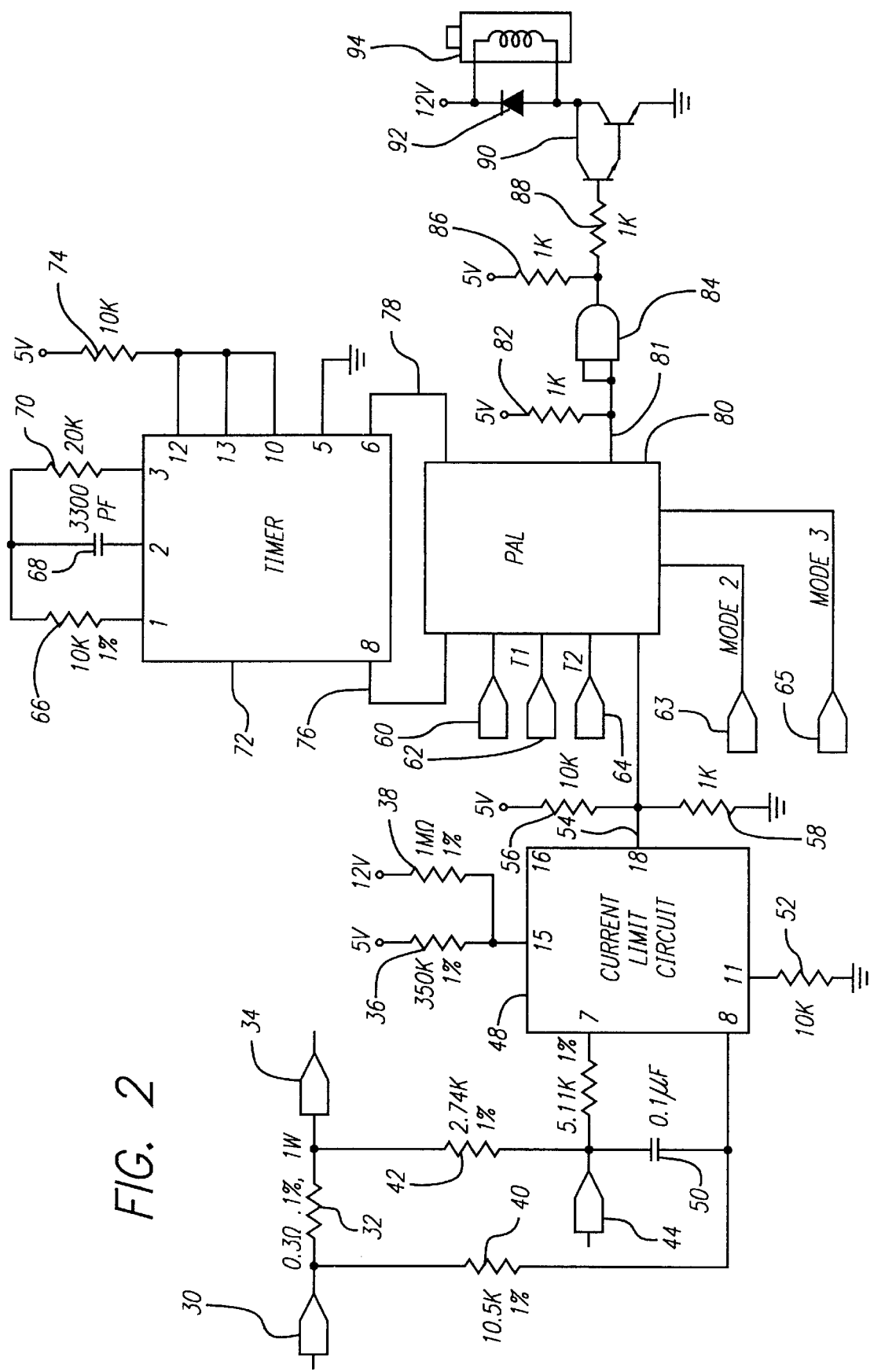
FIG. 2 is a schematic of the electronic circuit used in the preferred embodiment of the invention.

The present invention discloses an apparatus and method for unlocking removable mass-storage drives. In the following description, numerous specific details are set forth, including representative electronic components, component values, etc. to provide a thorough understanding of the present invention. However, it will be apparent to one skilled in the art that the present invention may be practiced without these specific details.

In other instances, well-known circuits and structures are not described in detail in order not to obscure the present invention unnecessarily. For example, the present invention relates to housings for removable mass-storage drives, and such housings typically contain power supplies, connectors, and other subsystems, which are not shown in the figures or described. It will be appreciated by one skilled in the art that these additional subsystems may be necessary to integrate the present invention into a complete housing. Similarly, certain power, ground, control and other lines are not shown in the drawings, but their addition would be apparent to one skilled in the art based upon the description of the present invention in this Specification.

Referring now to the figures, FIG. 1A depicts the environment in which the invention is designed to operate. Housing 400 contains removable mass-storage drives 410 and 420. The housing also contains indicator LEDs 415 and 425 to indicate to the user the status of the drives 410 and 420. The housing is connected by means of a SCSI bus cable 430 to a computer 440.

FIG. 1B is an overall block diagram of the preferred embodiment. Initially latch 320 is in a position which does not allow the user to remove the removable drive which it locks. A current sensor 305 detects when the current into that removable drive from 12-volt power supply 300 falls below a threshold. Current sensor 305 signals controller 330, which begins to flash LED 350. Controller 330 then waits a period of time which depends on the settings of jumpers 345. Depending on what period of time controller 330 is waiting for, it either counts a number of cycles of the five-second timer 310 or a number of cycles of 300 ms timer 315. At the end of the appropriate waiting period, controller 330 stops flashing LED 350 and causes solenoid 340 to operate latch 320 so that the removable drive may be removed by the user.

FIG. 2 depicts the electronic circuit used in the preferred embodiment of the invention to accomplish the functions of sensing current, waiting the necessary amount of time, and driving the locking mechanism. The circuit employs the two power supplies, 5 volt and 12 volt, which are normally needed for removable mass-storage drives. The current supplied to the removable storage drive by the 12 volt power supply passes through terminals 30 and 34. Between those terminals, a 0.3 ohm±1% resistor 32 is connected which is used to sense the current. This resistor is rated for 1 watt of dissipation.

The current passing through resistor 32 is sensed by the current limit circuit 48, which in the preferred embodiment comprises an LM1946 integrated circuit manufactured by National Semiconductor. The LM1946 is a specialized part designed specifically for current sensing applications. The two ends of resistor 32 are connected to pins 7 (positive input) and 8 (negative input) of current limit circuit 48 through 1% precision resistors 40, 42, and 46. The terminal 44 is employed in order to allow the threshold current which is detected to be altered by means of a jumper on the removable mass-storage drives as discussed below. Current limit circuit 48 asserts signal 54 (pin 13 of current limit circuit 48) whenever the voltage across resistor 32 exceeds a threshold value.

The threshold voltage value across resistor 32 at which signal 54 changes state is programmed by means of the 1% precision resistors 36 and 38, which are connected respectively between the 5 volt and 12 volt supplies and pin 15 of current limit circuit 48. Current limit circuit 48 is powered by the 5 volt power supply, but for simplicity those connections are not shown in the diagram.

Signal 54 is interfaced through resistors 56 and 58 to one input of the programmable array logic (PAL) device 80. Other inputs to the PAL device include a clock with a 300 ms period 60 and two terminals 62 and 64 (also referred to as T1 and T2) connected to jumper positions on the removable storage module. Further inputs to PAL device 80 are inputs 63 and 65 (also referred to as MODE2 and MODE3).

Like the current limit circuit 48, PAL device 80 is powered by the 5 volt power supply, but for simplicity those connections are not shown in the diagram. In the preferred embodiment, other inputs and outputs of PAL device 80 are used for other functions not relevant to the claimed invention. PAL device 80 in the preferred embodiment comprises an AMD 26V12, but persons skilled in the art will note that any of a number of commercially available PALs may alternatively be employed to achieve the same function.

PAL device 80 also receives an input signal 76 from timer chip 72. That chip is programmed so that when PAL device 80 asserts signal 78, timer chip 72 will assert signal 76 five seconds later. Timer chip 72 may be any of a large number of available timer chips capable of performing this function, but in the preferred embodiment timer chip 72 is a CD4541 timer chip from National Semiconductor. (Pin-for-pin compatible timer chips are also available from other semiconductor manufacturers.) The resistor-capacitor network comprising resistors 66 and 70 and capacitor 68 is employed to program the basic frequency of the CD4541 timer chip 72. The 5-volt connections of pins 10, 12, and 13 of timer chip 72 through resistor 74, as well as the ground connection of pin 5, are used to program the timer chip to operate as desired. In particular, the 5 volt connection of pins 12 and 13 indicates that the timer chip is to divide its basic frequency by $2^{16}$.

Upon assertion of the signal 54 indicating that the current flowing through resistor 32 into the removable drive has fallen below the predetermined threshold, PAL device 80 checks whether MODE2 input 63 is asserted. If that input 63 is not asserted, the assertion of signal 54 has no effect.

Supposing that MODE2 input 63 is asserted, PAL device 80 then determines whether the T1 and T2 terminals 62 and 64 are asserted. The assertion states of those terminals depend on the settings of jumpers 345 on the removable drive. Depending on the assertion states of those terminals, PAL device 80 will assert output 81 in 2 seconds (T1 deasserted and T2 deasserted), 10 seconds (T1 asserted, T2 deasserted), 15 seconds (T1 deasserted, T2 asserted), or 20 seconds (T1 asserted, T2 asserted).

In order to assert output 81 in 2 seconds, PAL device 80 counts using its 300 ms clock input 60. Using techniques well known in the art, it counts through six cycles of that clock and then asserts output 81. In order to assert output 81 in 10, 15, or 20 seconds, PAL device 80 counts 5-second cycles of the timer chip 72.

The locking mechanism is a small latch, discussed in more detail below, which slides into a position that impedes the movement of the removable drive. Solenoid 94 is moves this latch back and forth, so that electrical signals driving that solenoid can determine whether the latch is in the position which impedes removal or in the position which permits removal. Because the PAL output 81 cannot directly drive suitable commercial solenoids, resistors 82, 86, 88, AND gate 84, transistor pair 90 and diode 92 are employed to provide suitable drive to solenoid 94.

Figures 1, 3:
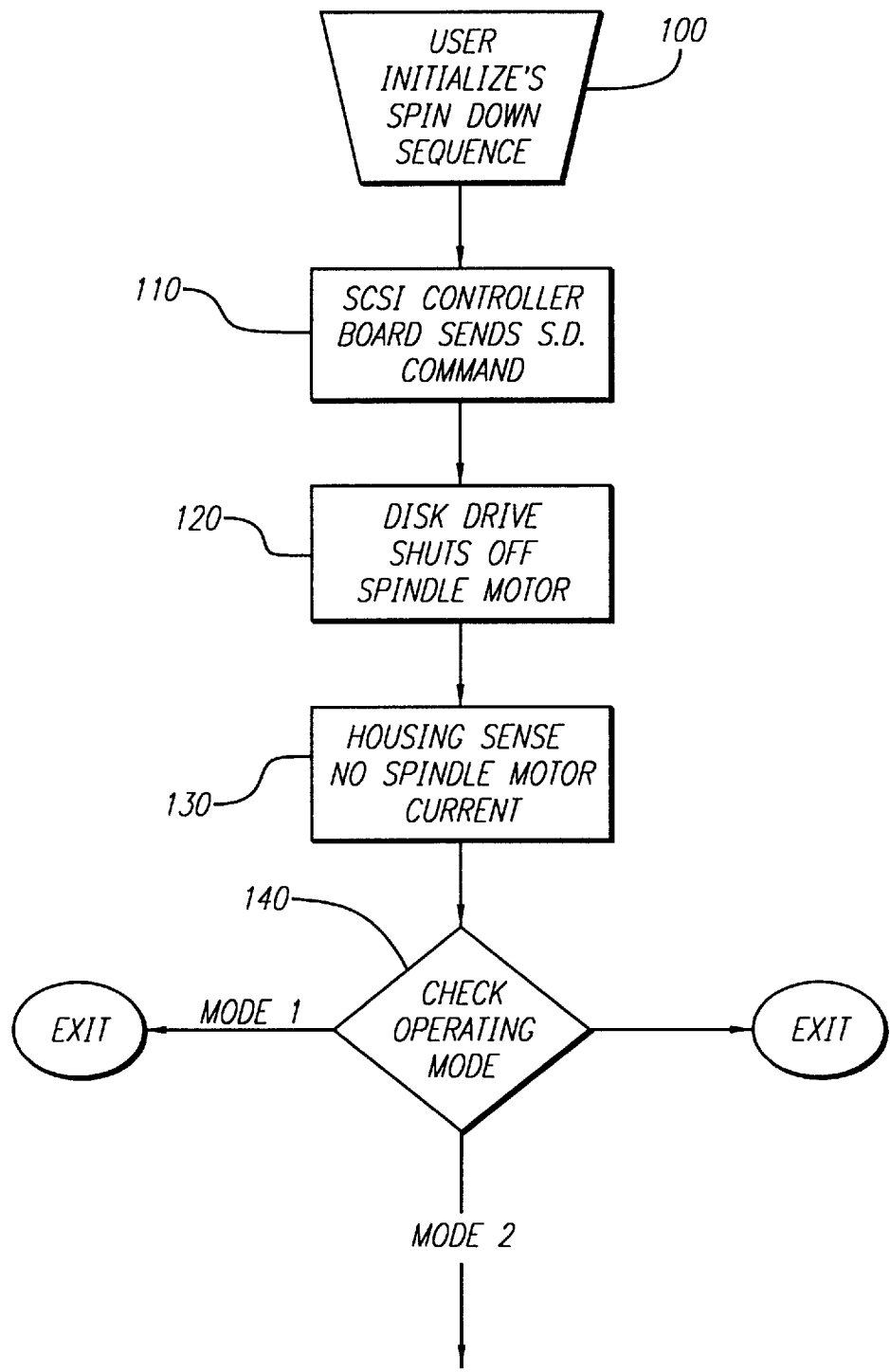
FIG. 3 depicts in flowchart form the operation of the preferred embodiment.

FIG. 3 represents the operation of the preferred embodiment in flowchart form. As indicated in box 100, it is initially the user of a computer to which the removable drives are attached who initiates the spin down of a removable drive. This user operation causes system software to send a spin down command over the SCSI or similar bus to the removable drive (box 110). The drive then shuts off its spindle motor (box 120), greatly reducing the amount of current which it draws from the 12 volt power supply. The housing electronics senses, as explained above, that the current has fallen below the predetermined threshold (box 130). It then checks whether the operating mode is set to 2 by means of the MODE2 signal 63 discussed above (box 140). If the mode is indeed 2, the assertion states of the T1 and T2 signals are checked, and a time delay is selected on that basis (box 150). As discussed above, an LED is blinked to signal to the user that he or she may not yet remove the removable drive (boxes 155, 160, 170, 180), an appropriate time period is allowed to pass (boxes 185, 190, 200, 210), the LED stops blinking (box 220), power is cut off to the removable mass-storage drive (box 230), and the solenoid-actuated latching mechanism is released (box 240).

FIG. 4 depicts the mechanical design of the latch of the preferred embodiment in a bottom elevational view (i.e. looking up). A bracket 450 holds the latch 465 in place and permits it to pivot around the fastener 452. The bracket 450 is attached to the backplane 455 of the housing. The latch 465 is normally held in place against the removable drive 470 by a spring 462. When solenoid 460, also attached to the backplane 455, is energized by the electronics, it pulls latch 465 away from its normal position (towards the left in the drawing), causing latch 465 to disengage from the removable drive 470 and allow the user to remove that drive by pulling the drive forward (down in the drawing).

It is found that the best current threshold for detection of the spin down of removable mass-storage drives is 185 mA (equivalent to 55.5 mV across 0.3 ohm resistor 32). This determination is based on surveying the typical current drawn from the 12 volt power supply by the removable drives available on the market today when those drives are spun up and when they are spun down. However, it is found that certain unusual removable drives do not draw 185 mA of current from the 12 volt power supply, even when spinning at full speed. This problem may be addressed most readily by adding to those removable drives a resistor in parallel with the drive itself across the 12 volt power supply terminals which brings their current consumption above the threshold.

In contrast, it is also found that certain drives may draw more than 185 mA even when spun down. It has therefore been found desirable, in the preferred embodiment of the invention, to allow a jumper on the removable memory drive to be used to raise the current threshold to a higher level. The jumper connects the 12 volt supply to terminal 44, which results in an increase of the threshold voltage which is required for current limit circuit 48 to assert signal 54. The increase occurs because resistor 42 is effectively bypassed.

It will be readily appreciated by those skilled in the art that many changes may be made in the circuit of the preferred embodiment without departing from the spirit of the invention. As noted above, for example, other timer chips and PALs may be used, as may other modes of sensing current besides the use of the preferred LM1946 chip. Consequently, the scope of the invention is not to be measured by the preferred embodiment but rather in terms of the claims which follow.

What is claimed is:

1. A housing for a removable computer mass-storage drive, said housing comprising:

a locking mechanism coupled to said removable drive;

a detection circuit for detecting an electrical characteristic indicating that said removable drive has begun to spin down;

a controller which, after said detection circuit has detected said electrical characteristic, waits a predetermined time before deactivating said locking mechanism; and a plurality of terminals coupled to said removable drive; where said controller selects said predetermined time from among a plurality of predetermined time values according to an impedance which said removable drive presents across said plurality of terminals.

2. The housing of claim 1, further comprising:

a power supply through which power is supplied to said removable drive;

where said electrical characteristic is the difference between the amount of current supplied through said power supply terminal to said removable drive and a predetermined threshold current value.

3. A method for determining when to unlock a removable computer mass-storage drive, said method comprising the steps of:

detecting an electrical characteristic indicating that said removable drive has begun to spin down; then waiting a predetermined time before deactivating said locking mechanism; and selecting said predetermined time from among a plurality of predetermined time values according to the impedance which said removable drive presents across a plurality of terminals on said removable drive.

4. The method of claim 3, where said electrical characteristic is the difference between the amount of current supplied through a power supply terminal to said removable drive and a predetermined threshold current value.

* * * * *